United States Patent
Cai et al.

(10) Patent No.: US 6,610,215 B1
(45) Date of Patent: Aug. 26, 2003

(54) OXYGEN SCAVENGING COMPOSITIONS SUITABLE FOR HEAT TRIGGERING

(75) Inventors: Gangfeng Cai, Danville, CA (US); Ta Yen Ching, Novato, CA (US); Hu Yang, San Ramon, CA (US)

(73) Assignee: Chevron Phillips Chemical Co., LP, San Ramon, CA (US)

( * ) Notice: Subject to any disclaimer, the term of this patent is extended or adjusted under 35 U.S.C. 154(b) by 128 days.

(21) Appl. No.: 09/690,878

(22) Filed: Oct. 16, 2000

(51) Int. Cl.$^7$ .................................................. C09K 3/00
(52) U.S. Cl. .................................. 252/188.28; 428/35.7
(58) Field of Search ..................... 252/188.28; 428/35.7, 428/36.6

(56) References Cited

U.S. PATENT DOCUMENTS

| | | | |
|---|---|---|---|
| 3,497,571 A | 2/1970 | Tellier et al. ............... 260/844 |
| 3,536,687 A | 10/1970 | Nordstrom .................. 260/89.5 |
| 4,415,710 A | 11/1983 | Barnabeo et al. ........... 525/370 |
| 4,524,201 A | 6/1985 | Barnabeo et al. ........... 528/395 |
| 5,116,916 A | 5/1992 | Young ....................... 525/350 |
| 5,211,875 A | 5/1993 | Speer et al. ............. 252/188.28 |
| 5,310,497 A | 5/1994 | Ve Speer et al. ....... 252/188.28 |
| 5,346,644 A | 9/1994 | Speer et al. ............. 252/188.28 |
| 5,425,896 A | 6/1995 | Speer et al. ............. 252/188.28 |
| 5,466,756 A | 11/1995 | Roach et al. ............. 525/330.6 |
| 5,498,364 A | 3/1996 | Speer et al. ............. 252/188.28 |
| 5,627,239 A | 5/1997 | Ching et al. ............. 525/330.6 |
| 5,641,825 A | 6/1997 | Bacskai et al. ............. 524/398 |
| 5,656,692 A | 8/1997 | Hayes ......................... 525/63 |
| 5,660,761 A | 8/1997 | Katsumoto et al. .... 252/188.28 |
| 5,700,554 A | 12/1997 | Speer et al. ................. 428/220 |
| 5,736,616 A | 4/1998 | Ching et al. ............. 525/330.3 |
| 5,759,653 A * | 6/1998 | Collette ..................... 428/35.9 |
| 5,776,361 A | 7/1998 | Katsumoto et al. .... 252/188.28 |
| 5,837,158 A | 11/1998 | Shepodd et al. ......... 252/181.6 |
| 5,859,145 A | 1/1999 | Ching et al. ............. 525/330.6 |
| 5,911,910 A | 6/1999 | Becraft et al. .......... 252/188.28 |
| 6,057,013 A | 5/2000 | Ching et al. ................ 428/35.7 |
| 6,063,307 A | 5/2000 | Shepodd et al. ......... 252/181.6 |
| 6,254,803 B1 * | 7/2001 | Matthews ............... 252/188.28 |
| 6,254,804 B1 * | 7/2001 | Matthews ............... 252/188.28 |
| 6,255,248 B1 * | 7/2001 | Bansleben ................... 502/159 |
| 6,287,653 B1 * | 9/2001 | Speer ......................... 428/35.4 |
| 6,333,087 B1 * | 12/2001 | Jerdee ....................... 438/35.9 |

FOREIGN PATENT DOCUMENTS

| | | |
|---|---|---|
| WO | WO99/48963 | 3/1999 |
| WO | WO99/38914 | 8/1999 |
| WO | WO00/11972 | 3/2000 |
| WO | WO00/37321 | 6/2000 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond,* OSP Conference, pp. 1–8 (Chicago, Jun. 19–20, 2000).

Ching et al., "Tasteless Oxygen Scavenging Polymers: A New Platform Technology for Food Packaging Based On Controlled Oxidation," *Oxygen Absorber . . . 2001 and beyond,* OSP Conference Slides (Chicago, Jun. 19–20, 2000).

* cited by examiner

*Primary Examiner*—Cephia D. Toomer
(74) *Attorney, Agent, or Firm*—Williams, Morgan and Amerson

(57) ABSTRACT

Methods of initiating oxygen scavenging are disclosed herein that rely on heat triggering. An oxygen scavenging composition that comprises an oxidizable organic compound and a transition metal catalyst is heated to an extent sufficient to initiate oxygen scavenging. Heat triggering can take place during the manufacture of a film or a packaging article from an oxygen scavenging composition, or it can take place after the film or packaging article has been manufactured.

18 Claims, 1 Drawing Sheet

OXYGEN SCAVENGING COMPOSITIONS SUITABLE FOR HEAT TRIGGERING

BACKGROUND OF THE INVENTION

1. Field of the Invention

The present invention relates generally to the field of oxygen scavenging materials. More particularly, it concerns methods of initiating oxygen scavenging in oxygen scavenging compositions by heating the composition.

2. Description of Related Art

It is well known that limiting the exposure of oxygen-sensitive products to oxygen maintains and enhances the quality and shelf life of the product. For instance, by limiting the oxygen exposure of oxygen sensitive food products in a packaging system, the quality of the food product is maintained, and food spoilage is avoided. In addition, such packaging also keeps the product in inventory longer, thereby reducing costs incurred from waste and restocking. In the food packaging industry, several means for limiting oxygen exposure have already been developed, including modified atmosphere packaging (MAP), vacuum packaging and oxygen barrier film packaging.

Another means for limiting oxygen exposure involves incorporating an oxygen scavenger into the packaging structure. Incorporation of a scavenger in the package can provide a uniform scavenging effect throughout the package. In addition, such incorporation can provide a means of intercepting and scavenging oxygen as it is passing through the walls of the package (herein referred to as an "active oxygen barrier"), thereby maintaining the lowest possible oxygen level throughout the package. In many cases, however, the onset of oxygen scavenging in this system may not occur for days or weeks. The delay before the onset of useful oxygen scavenging is hereinafter referred to as the induction period.

Much work has been done to minimize the induction period. Speer et al., U.S. Pat. No. 5,211,875, and Ching et al., U.S. Pat. No. 5,859,145, disclose methods for minimizing the induction period by initiating oxygen scavenging via exposure to radiation. Both teach methods that rely on radiation that comprises UV or visible light, with wavelengths that comprise UV radiation being preferred. Such UV initiation systems are especially useful for oxygen scavenging compositions that comprise non-aromatic polymers.

Although UV triggering permits control of when oxygen scavenging is initiated, the use of such methods that rely on UV radiation for induction of oxygen scavenging has limitations. First, oxygen-scavenging compositions can comprise materials that are opaque to UV radiation, thus limiting the ability of the UV radiation to activate oxygen scavenging. For example, oxygen scavenging compositions that comprise polymers like polyethylene terephthalate (PET) or polyethylene naphthalate (PEN) are difficult to trigger using UV initiation methods because these polymers absorb UV light. Furthermore, due to the geometric and physical constraints associated with UV radiation, it can be difficult to achieve uniform UV treatment of preformed, angular oxygen scavenging packaging articles. Examples of such angular packaging articles are gable-top cartons, parallelepiped cartons, plastic bottles, and glass bottles, among other containers. Still further, methods of initiation of oxygen scavenging that rely on UV irradiation are most often associated with oxygen scavenging compositions that comprise photoinitiators. In general, such photoinitiators are relatively expensive. Furthermore, certain photoinitiators can actually have undesirable traits (e.g. cause yellowing) that must be taken into consideration when designing compositions and articles that incorporate them.

A need exists for the ready initiation of oxygen scavenging in oxygen scavenging compositions that is efficient regardless of whether UV opaque materials are present in the composition. It is also desirable to have methods of initiating oxygen scavenging that are effective with oxygen scavenging compositions that comprise aromatic polymers. Improved methods for uniform initiation of oxygen scavenging in angular packaging articles would be useful. Furthermore, it would be beneficial to have oxygen scavenging compositions and packaging articles that do not require photoinitiators for efficient initiation of oxygen scavenging.

SUMMARY OF THE INVENTION

The present invention is directed to methods of initiating oxygen scavenging that rely on heating an oxygen scavenging composition.

One aspect of the invention is directed to a method of initiating oxygen scavenging by an oxygen scavenging composition that comprises an oxidizable organic compound and a transition metal catalyst. The oxidizable organic compound has a polymeric backbone with cyclic olefinic moieties, and initiation of oxygen scavenging is accomplished by heating the oxygen scavenging composition. Preferably the polymeric backbone is ethylenic. It is also preferred that the cyclic olefinic moieties are pendant to the polymeric backbone, though in certain other embodiments of the present invention the polymeric backbone of the oxidizable organic compound can comprise at least one ring carbon of the cyclic organic moiety.

Heating of the oxygen scavenging composition to an extent sufficient to initiate oxygen scavenging can take place during the process of forming the oxygen scavenging composition into a packaging article or film, or it can take place after the oxygen scavenging composition has been formed into a packaging article or film.

In addition to the oxidizable organic compound and the transition metal catalyst, the oxygen scavenging composition can further comprise a material selected from antioxidants, co-catalysts, additional polymers and pigments.

By using methods of initiating oxygen scavenging of the present invention, initiation of oxygen scavenging can be achieved without the use of UV irradiation. Exposing oxygen scavenging materials to a source of heat does not involve the same types of physical constraints as UV radiation, and heat can be used to initiate oxygen scavenging in certain oxygen scavenging compositions that can not be readily activated by UV radiation (i.e. compositions comprising aromatic polymers or UV opaque materials). For example, certain oxygen scavenging compositions that cannot be successfully triggered by UV exposure because they comprise UV opaque materials can be triggered by heat. Furthermore, when the oxygen scavenging composition is part of an angular packaging article, heat initiation methods can be used successfully for initiating oxygen scavenging, even though initiation by UV exposure can be difficult in such angular packaging articles. In addition, methods of the present invention do not require photoinitiators or UV exposure, and in certain embodiments the heating step can be combined with a process of forming a packaging article or a film from the oxygen scavenging composition; thus methods of the present invention can be less expensive than UV initiation methods.

DESCRIPTION OF ILLUSTRATIVE EMBODIMENTS

Figure 1:
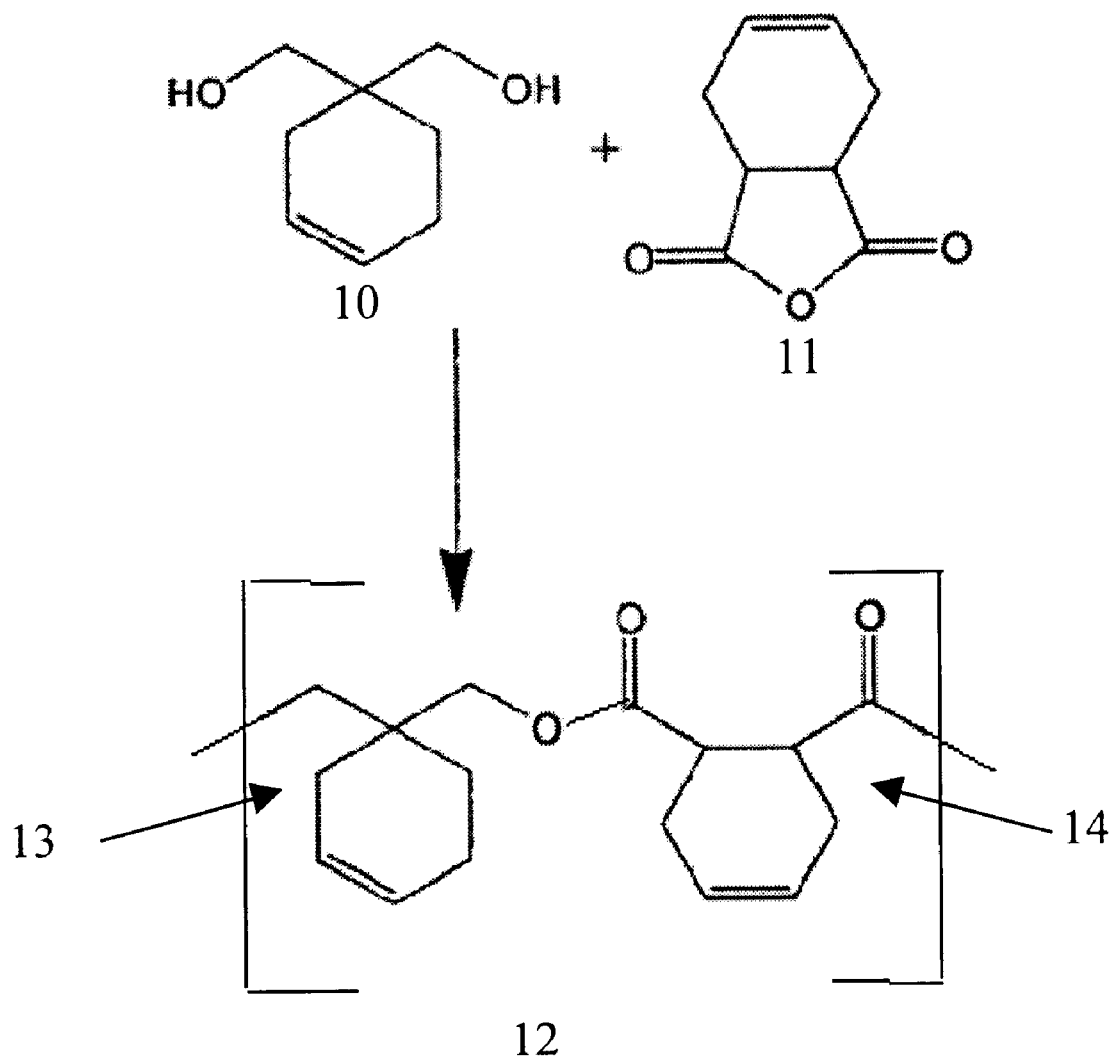
FIG. 1 is a schematic of a synthesis of an oxidizable organic compound that can be used in certain embodiments of the present invention.

One embodiment of the present invention is a method of initiating oxygen scavenging that comprises providing an oxygen scavenging composition that comprises an oxidizable organic compound and a transition metal catalyst, wherein the oxidizable organic compound comprises an polymeric backbone and at least one cyclic olefinic group; and heating the oxygen scavenging composition to an extent sufficient to initiate oxygen scavenging. Preferably the heating resulting in oxygen scavenging initiation is performed for up to about 60 minutes, more preferably between about 0.5 minutes and 60 minutes. The polymeric backbone can be polyester, polyether, polythioether, polycarbonate, polyamide or polyethylene, or a combination of two or more thereof Preferably the polymeric backbone is ethylenic. It is also preferred that the cyclic. olefinic group be pendant to the polymeric backbone. However in other embodiments, the polymeric backbone can comprise at least one ring carbon of the cyclic olefinic group and thus the cyclic olefinic group is not pendant. Certain oxidizable organic compounds that comprise a cyclic olefinic group that is not pendant can be produced through polymerization of a diol with an anhydride, the cyclic olefinic group can be introduced into polymer through either the diol or the anhydride or both.

One synthesis scheme for an oxidizable organic compound in which the cyclic olefinic moiety is not pendant is shown in FIG. 1. This scheme involves reacting 3-cyclohexene-1,1-dimethanol 10 with cis-1,2,3,6-tetrahydrophthalic anhydride 11. The resulting polymer 12 has two different cyclic olefinic groups: one that is introduced through the anhydride with two ring carbons belonging to the polymeric backbone 14, and another that is introduced through the diol with one ring carbon belonging to the polymeric backbone 13.

Oxygen scavenging compositions used in this method can be provided in several different forms. They can be provided as manufacturing intermediates, like polymer blends or preforms, or alternatively the oxygen scavenging compositions can be provided as finished articles. Finished articles can be provided in the form of a single or multilayer film, in the form of a film that is part of a packaging article, or in the form of a rigid, semi-rigid, or flexible packaging article that has a single layer or multiple layers. Alternatively the composition can be provided as a component or layer of an oxygen scavenging film or packaging article.

In certain embodiments of the present invention, the oxygen scavenging composition consists essentially of an oxidizable organic compound and a transition metal catalyst. Preferably the oxygen scavenging composition does not comprise a photoinitiator, though this is not intended to imply that oxygen scavenging compositions that comprise photoinitiators could not be used in the methods of the present invention. Thus the preferred oxygen scavenging compositions of the present invention do not require UV radiation exposure to initiate oxygen scavenging. In other preferred embodiments, the oxygen scavenging composition can further comprise at least one material selected from antioxidants, co-catalysts, additional polymers, and pigments.

Heat applied during the process of forming a packaging article from an oxygen scavenging composition can be sufficient to cause heat triggering, or additional heat can be applied to a finished article. Examples of finished articles that can be heat triggered subsequent to their manufacture are packaging articles and films. Heat sources for heat triggering can be selected from those known.in the art. For example, hot air can be blown on the oxygen scavenging composition or infrared radiation can be used to heat the oxygen scavenging composition. The heat triggering can be performed under nitrogen or in a low oxygen atmosphere, in which the oxygen concentration is lower than in air. Regardless of when the oxygen scavenging composition is heated, during or after the formation of a packaging article or film, preferably the oxygen scavenging composition is heated to a temperature between about 75° C. and about 300° C. If the heat triggering is performed during extrusion or co-extrusion of a film or an article, it is preferred that the temperature be between about 170° C. and about 280° C. It should be noted that mixing temperature and time must be carefully controlled to obtain a blend of oxidizable organic compound and transition metal catalyst that is not triggered until processing that occurs after mixing. The temperature of the heating apparatus and the duration of exposure that is sufficient for heat triggering will vary depending on the oxygen scavenging composition, the oxidizable organic compound, the presence and quantity of transition metal salts, antioxidants, and other additives in the composition, the design of the heating apparatus, the proximity of the packaging article to the heat source, the nature of heat transfer (typically convection), and other parameters apparent to one of ordinary skill in the art.

Oxygen scavenging compositions of the present invention comprise an oxidizable organic compound that comprises a polymeric backbone and at least one cyclic olefinic pendant group. Preferably, the polymeric backbone is ethylenic and the cyclic olefinic pendant group has the structure (I):

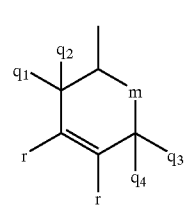

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen. One preferred oxidizable organic compound is ethylene-vinyl cyclohexene copolymer (EVCH). The oxidizable organic compound can further comprise a linking group linking the polymeric backbone and the cyclic olefinic pendant group, wherein the linking group is selected from:

—O—$(CHR)_n$—; —(C=O)—O—$(CHR)_n$—; —NH—$(CHR)_n$—; —O—(C=O)—$(CHR)_n$—; —(C=O)—NH—$(CHR)_n$—; or —(C=O)—O—CHOH—$CH_2$—O—;

wherein R is hydrogen, methyl, ethyl, propyl, or butyl; and n is an integer from 1 to 12, inclusive. Preferred oxidizable organic compounds that have a linking group between their cyclic olefinic pendant groups and their backbones are ethylene/methyl acrylate/cyclohexenyl methyl acrylate terpolymer (EMCM) and cyclohexenylmethyl acrylate (CHAA) homopolymer.

The oxygen scavenging composition comprises a transition metal catalyst. The transition metal catalyst accelerates the rate of oxygen scavenging. Though not to be bound by theory, useful catalysts include those which can readily interconvert between at least two oxidation states. See Sheldon, R. A.; Kochi, J. K.; "Metal-Catalyzed Oxidations of Organic Compounds" Academic Press, New York 1981.

Preferably, the catalyst is in the form of a salt, with the transition metal selected from the first, second or third transition series of the Periodic Table. Suitable metals and their oxidation states include, but are not limited to, manganese II or III, iron II or III, cobalt II or III, nickel II or III, copper I or II, rhodium II, III or IV, and ruthenium. The oxidation state of the metal when introduced need not necessarily be that of the active form. The metal is preferably iron, nickel, manganese, cobalt or copper; more preferably manganese or cobalt; and most preferably cobalt. Suitable counterions for the metal include, but are not limited to, chloride, acetate, stearate, palmitate, 2-ethylhexanoate, neodecanoate or naphthenate. Preferably, the salt, the transition metal, and the counterion are either on the U.S. Food and Drug Administration GRAS (generally regarded as safe) list, or exhibit substantially no migration to the product from the oxygen scavenging composition when it is part of a packaging article (i.e. less than 50 ppb in edible dietary intake (EDI)). Particularly preferable salts include cobalt oleate, cobalt stearate, and cobalt neodecanoate. The metal salt can also be an ionomer, in which case a polymeric counterion is employed. Such ionomers are well known in the art.

Typically, the amount of transition metal catalyst can range from 0.001 to 1% (10 to 10,000 ppm) the oxidizable organic compound, based on the metal content only (excluding ligands, counterions, etc.). Preferably the transition metal catalyst is blended directly with the oxidizable organic compound. The transition metal catalyst can be a component of a layer that comprises the oxidizable organic compound (e.g. an oxygen scavenging layer) or, less preferably, it can be a component of a layer adjacent to such an oxygen scavenging layer. In the event the amount of transition metal catalyst is less than 1%, it follows that the oxidizable organic compound, and any additional polymer or additives, will comprise substantially all of the scavenging composition or article, i.e. more than 99%.

Antioxidants can be used with oxygen scavenging compositions to control scavenging initiation. An antioxidant as defined herein is a material which inhibits oxidative degradation or cross-linking of polymers. Typically, antioxidants are added to facilitate the processing of polymeric materials or prolong their useful lifetime. In relation to this invention, such additives prolong the induction period for oxygen scavenging in the absence of heat that triggers oxygen scavenging. When it is desired to accelerate the commencement of oxygen scavenging by an oxygen scavenging composition, the composition is exposed to heat that is suited to triggering oxygen scavenging in that particular composition.

Antioxidants such as 2,6-di(t-butyl)-4-methylphenol (BHT), 2,2'-methylene-bis(6-t-butyl-p-cresol), triphenylphosphite, tris-(nonylphenyl)phosphite, dilaurylthiodipropionate, vitamin E, and tetra [methylene (3,5-di-tert-butyl-4-hydroxyhydrocinnamate)]methane are suitable for use with this invention.

The amount of an antioxidant, when present, can also have an effect on oxygen scavenging. As mentioned earlier, such materials are usually present with oxidizable organic compounds or additional polymers to prevent oxidation or gelation of the polymers. Typically, they are present in about 0.005 to 0.05% by weight of the oxidizable organic compound. However, additional amounts of antioxidant can also be added if it is desired to tailor the induction period.

Oxygen scavenging compositions of the present invention can comprise one or more additional polymers. Such additional polymers can be structural polymers that are thermoplastic and render the oxygen scavenging composition more adaptable for use in a packaging article. Suitable structural polymers include, but are not limited to, polyethylene, low density polyethylene, very low density polyethylene, ultra-low density polyethylene, high density polyethylene, polyethylene terephthalate (PET), polyvinyl chloride, and ethylene copolymers such as ethylene-vinyl acetate, ethylene-alkyl (meth)acrylates, ethylene-(meth)acrylic acid, and ethylene-(meth)acrylic acid ionomers. In rigid articles, such as beverage containers, PET is often used. Blends of different structural polymers can also be used. However, the selection of the structural polymer largely depends on the article to be manufactured and the end use thereof. Such selection factors are well known in the art. For instance, the clarity, cleanliness, effectiveness as an oxygen scavenger, barrier properties, mechanical properties, or texture of the article can be adversely affected by a blend containing a structural polymer that is incompatible with the oxidizable organic compound.

Oxygen scavenging compositions can further comprise at least one co-catalyst to speed heat triggering. A co-catalyst can be an amine or an amide. Preferred co-catalysts are low molecular weight polyethers having at least one amine terminal group, polyamides, and nylons, among others.

An oxygen scavenging composition can be provided in the form of a film or a packaging article, including a component (integral or non-integral) of a packaging article. When provided in the form of a film, the film can be autonomous or can be an integral or non-integral part of a packaging article. Packaging articles suitable for comprising oxygen scavenging compositions can be flexible, rigid, semi-rigid or some combination thereof. Examples of oxygen scavenging packaging articles that can be used in the present invention, include gable-top cartons, parallelepiped cartons, trays, cups, bags and bottles among other containers. Materials that can be used in making such containers include paper, cardboard, fiberboard, glass or plastic. Such containers can be used as juice cartons, soft drink containers, tofu containers, and beer bottles, among other uses. Rigid packaging articles typically have wall thicknesses in the range of 100 to 1000 micrometers. Typical flexible packages that can be used in the present invention include those used to package food items such as meats, cheeses, fresh pastas, snack foods, or coffees, among others, and they typically have thicknesses of 5 to 250 micrometers. Furthermore, the oxygen scavenging composition can be provided in a non-integral oxygen scavenging component or a layer of a package, e.g., it can be in the form of a coating, a bottle cap liner, an adhesive or a non-adhesive sheet insert, a gasket, a sealant, or a fibrous mat insert, among others. Oxygen scavenging components can also consist of a single layer or multiple layers. Generally, packaging articles (flexible, rigid, semi-rigid, or combinations of these) and packaging components comprising oxygen scavenging compositions can be used in packaging any product for which it is desirable to inhibit oxygen damage during storage, e.g. foods, beverages, cosmetics, pharmaceuticals, medical products, corrodible metals, or electronic devices, among others.

As stated above, the oxygen scavenging composition can be provided as an article that has a single layer or multiple layers. An oxygen scavenging layer comprises the oxidizable organic compound. When a packaging article or film comprises an oxygen scavenging layer, it can further comprises one or more additional layers, one or more of the additional layers can comprise an oxygen barrier layer, i.e. a layer having an oxygen transmission rate equal to or less than 100 cubic centimeters per square meter ($cc/m^2$) per day per atmosphere at room temperature (about 25° C.). Typical oxygen barriers comprise poly(ethylene vinylalcohol), polyacrylonitrile, polyvinyl chloride, poly(vinylidene dichloride), polyethylene terephthalate (PET), oriented PET, silica, foil, polyamides, or mixtures thereof.

Other additional layers of the oxygen scavenging packaging article can include one or more layers which are permeable to oxygen. For example, one embodiment of the present invention, a packaging article, can be comprised of the following layers, in order starting from the outside of the packaging article to the innermost layer (forming the hollow interior) of the packaging article, (i) a structural layer, (ii) an oxygen barrier layer, (iii) an oxygen scavenging layer comprising an oxidizable organic compound and a transition metal catalyst, and optionally, (iv) an oxygen-permeable seal or food-contact layer. Control of the oxygen barrier property of (ii) allows regulation of the scavenging life of the package by limiting oxygen ingress from the atmosphere to the scavenging layer (iii), and thus.slows the consumption of oxygen scavenging capacity by atmospheric oxygen. Layer (iv) can improve the heat-sealability, clarity, or resistance to blocking of the multi-layer packaging article. Also, control of the oxygen permeability of layer (iv) allows alteration of the rate of oxygen scavenging for the overall structure independent of the composition of the scavenging component (iii). Layer (iv) can permit oxygen from the headspace inside the package to pass to the oxygen scavenging layer (iii), while acting as a barrier to migration of the components of the scavenging layer, or by-products of scavenging, into the package interior.

Further additional layers, such as adhesive layers, can also be used in a multi-layer packaging article or film. Compositions typically used for adhesive layers include anhydride functional polyolefins and other well-known adhesive layers.

Oxygen scavenging layers and oxygen scavenging packaging articles of the present invention can be made by a number of different methods known in the art. For example, to prepare oxygen scavenging layers, films and articles, the desired components thereof can be melt-blended at a temperature between about 150° C. and about 300° C. Preferably the oxygen scavenging composition is heat triggered after melt-blending, and this should be considered in choosing the melt-blend temperature and duration, along with other factors known to those of skill in the art. Alternatives to melt-blending, such as the use of a solvent followed by evaporation, can also be employed in preparing a polymer blend. The blending can immediately precede the formation of the finished article, film or preform or precede the formation of a feedstock or masterbatch for later use in the production of finished packaging articles or films. When the blended composition is used to make an oxygen scavenging layer, film or a packaging article, (co-)extrusion, solvent casting, injection molding, stretch blow molding, orientation, thermoforming, extrusion coating, coating and curing, lamination, or combinations thereof would typically follow the blending. Heat triggering can be used during these processes or after they have been implemented, and the temperature of the oxygen scavenging composition and apparatuses used during these processes should be adjusted accordingly.

The following examples are included to demonstrate preferred embodiments of the invention. It should be appreciated by those of skill in the art that the techniques disclosed in the examples which follow represent techniques discovered by the inventor to function well in the practice of the invention, and thus may be considered to constitute preferred modes for its practice. However, those of skill in the art should, in light of the present disclosure, appreciate that many changes may be made in the specific embodiments which are disclosed and still obtain a like or similar result without departing from the spirit and scope of the invention.

EXAMPLE 1

988.4 Parts by weight of poly(ethylene/methyl acrylate/cyclohexene-methyl acrylate) (EMCM, manufactured by Chevron) was mixed at 250–270° C. with 23.2 parts by weight of cobalt oleate toluene solution containing 50 wt.% cobalt oleate on a twin screw extruder (Werner & Pfleiderer ZSK-30). 150 ppm of Irgonox 1010 antioxidant were also added to the blend. The extruder was equipped with two vacuum vents to remove the toluene during the mixing. The product was tumble dried at 40–50° C. for 4 hrs and then vacuum packaged in aluminum bags.

EXAMPLE 2

Commercial PET resin was dried at 170° C. for 4 hrs. A three-layer film having PET as outlayers (4–8 mil thickness) and thermal triggerable oxygen scavenging polymer (OSP) made in Example 1 as a core layer (2–4 mil thickness) was made on a Randcastle film extruder. The temperature for the feedblock, die and various zones was set to 270–280° C. The thick, three-layer film, after cooling, was reheated to 100° C. and then biaxially stretched 2.5–3.0 times. The film was stored at room temperature for 2–3 weeks and then tested on a Mocon OX-TRAN 2/20 for oxygen transmission rate at room temperature and 20–30% relative humidity. The oxygen transmission test showed that no oxygen permeated through the film. As a control, an analogous test was performed on a single layer PET film prepared in the same manner as the three-layer film described above without an OSP core layer, and this test showed that the control film has an oxygen-transmission rate of 15–60 cc $O_2/m^2$/day.

EXAMPLE 3

105.5 Parts by weight of neat cobalt oleate was mixed with 894.5 parts by weight of poly(ethylene/methyl acrylate) (EMAC, manufactured by Chevron) at 220–260° C. on a twin screw extruder (Werner & Pfleiderer ZSK-30). The cobalt containing masterbatch product was tumble dried at 40–50° C. for 4 hrs and then vacuum packaged in aluminum bags.

EXAMPLE 4

Commercial PET resin was dried at 170° C. for 4 hrs. A three-layer film having PET as outer layers (4–8 mil thickness) and a thermal triggerable oxygen scavenging polymer core layer (2–4 mil thickness) was made on a Randcastle film extruder. The thermal triggerable layer contained a blend from 90 parts by weight of poly(ethylene/methyl acrylate/cyclohexene-methyl acrylate) (EMCM, manufactured by Chevron) and 10 parts by weight of cobalt masterbatch made in Example 3. The temperature for the feedblock, die and various zones was set to 270–280° C. The thick, three-layer film, after cooling, was reheated to 100° C.

and then biaxially stretched 2.5–3.0 times. The film was stored at room temperature for 2–3 weeks and then tested on a Mocon OX-TRAN 2/20 for oxygen transmission rate at room temperature and 20–30% relative humidity. The oxygen transmission test showed that no oxygen permeated through the film. As a control, an analogous test was performed on a single layer PET film prepared in the same manner as the three-layer film described above without an OSP core layer, and this test showed that the control film has an oxygen transmission rate of 15–60 cc $O_2/m^2/day$.

All of the compositions and methods disclosed and claimed-herein can be made and executed without undue experimentation in light of the present disclosure. While the compositions and methods of this invention have been described in terms of preferred embodiments, it will be apparent to those of skill in the art that variations can be applied to the compositions and methods and in the steps or in the sequence of steps of the method described herein without departing from the concept, spirit and scope of the invention. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method of initiating oxygen scavenging, comprising:
providing an oxygen scavenging composition that comprises an oxidizable organic compound and a transition metal catalyst, wherein the oxidizable organic compound commprises an ethylenic backbone and at least one cyclic olefinic group that is a pendant group having the structure (I):

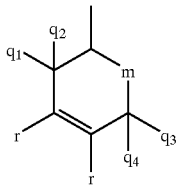

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen; and
heating the oxygen scavenging composition to an extent sufficient to initiate oxygen scavenging.

2. The method of claim 1, wherein the oxygen scavenging composition consists essentially of the oxidizable organic compound, the transition metal catalyst, and at least one additional polymer.

3. The method of claim 1, wherein the oxygen scavenging composition does not comprise a photoinitiator.

4. The method of claim 1, wherein the oxygen scavenging composition is not exposed to UV radiation while initiating oxygen scavenging.

5. The method of claim 1, wherein the heating occurs while forming a packaging article comprising the oxygen scavenging composition or a film comprising the oxygen scavenging composition.

6. The method of claim 5, wherein the packaging article or the film comprises a single layer.

7. The method of claim 5, wherein the packaging article or the film comprises multiple layers.

8. The method of claim 1, wherein the oxygen scavenging composition is provided in the form of a packaging article or a film and the oxygen scavenging composition is heated after it has been formed into the packaging article or film.

9. The method of claim 8, wherein the packaging article or film comprises a single layer.

10. The method of claim 8, wherein the packaging article or film comprises multiple layers.

11. The method of claim 1, wherein the oxygen scavenging composition is heated to a temperature between about 75° C. and about 300° C. for up to about 60 min.

12. The method of claim 1, wherein the oxidizable organic compound is ethylene-vinyl cyclohexene copolymer (EVCH).

13. The method of claim 1, wherein the oxidizable organic compound further comprises a linking group linking the ethylenic backbone and the cyclic olefinic group, wherein the linking group is selected from:

—O—$(CHR)_n$—; —(C=O)—O—$(CHR)_n$—; —NH—$(CHR)_n$—; —O—(C=O)—$(CHR)_n$—; —(C=O)—NH—$(CHR)_n$—; or —(C=O)—O—CHOH—$CH_2$—O—;

wherein R is hydrogen, methyl, ethyl, propyl, or butyl; and n is an integer from 1 to 12, inclusive.

14. The method of claim 13, wherein the oxidizable organic compound is ethylene/methyl acrylate/cyclohexenyl methyl acrylate terpolymer (EMCM) or cyclohexenylmethyl acrylate (CHAA) homopolymer.

15. The method of claim 1, wherein the transition metal catalyst comprises a transition metal that is selected from the group consisting of cobalt, copper, manganese, iron, nickel, rhodium, and ruthenium.

16. The method of claim 15, wherein the transition metal catalyst is cobalt oleate, cobalt stearate, or cobalt neodecanoate.

17. The method of claim 1, wherein the oxygen scavenging composition further comprises at least one material selected from the group consisting of antioxidants, co-catalysts, additional polymers, and pigments.

18. The method of claim 17, wherein the co-catalyst is an amide.

* * * * *